United States Patent
Elomari et al.

(10) Patent No.: US 7,737,067 B2
(45) Date of Patent: *Jun. 15, 2010

(54) REGENERATION OF IONIC LIQUID CATALYST

(75) Inventors: Saleh Elomari, Fairfield, CA (US); Thomas V. Harris, Benicia, CA (US); William Schinski, San Rafael, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 1127 days.

This patent is subject to a terminal disclaimer.

(21) Appl. No.: 11/316,552

(22) Filed: Dec. 20, 2005

(65) Prior Publication Data

US 2007/0142211 A1 Jun. 21, 2007

(51) Int. Cl.
*B01J 38/62* (2006.01)

(52) U.S. Cl. .................................... 502/28

(58) Field of Classification Search .............. None
See application file for complete search history.

(56) References Cited

U.S. PATENT DOCUMENTS

| | | | |
|---|---|---|---|
| 4,098,833 A | 7/1978 | Wristers | |
| 4,122,245 A | 10/1978 | Nardi et al. | |
| 4,463,071 A | 7/1984 | Gifford et al. | |
| 4,463,072 A | 7/1984 | Gifford et al. | |
| 5,104,840 A | 4/1992 | Chauvin et al. | |
| 5,304,522 A | 4/1994 | Jalkian et al. | |
| 5,731,101 A * | 3/1998 | Sherif et al. | 429/102 |
| 6,096,680 A | 8/2000 | Park | |
| 6,797,853 B2 | 9/2004 | Houzvicka et al. | |
| 2004/0077914 A1 | 4/2004 | Zavilla et al. | |
| 2004/0133056 A1 | 7/2004 | Liu et al. | |

FOREIGN PATENT DOCUMENTS

WO    WO9413604    * 6/1994

OTHER PUBLICATIONS

Formentin, Pilar et al, Ionic liquids as exceedinly convenient solvents for the friedel crafts monoalkylation of electron rich arenes with paraformaldeyde using HCL as catalyst, Mar. 2002, Catalysis Letters, vol. 78, Nos. 1-4, pp. 115-118.*

(Continued)

*Primary Examiner*—Melvin C Mayes
*Assistant Examiner*—Stefanie Cohen
(74) *Attorney, Agent, or Firm*—Susan M. Abernathy; Steven H. Roth

(57) ABSTRACT

A process for regenerating a used ionic liquid catalyst comprising a cationic component and an anionic component, which catalyst has been deactivated by conjunct polymers complexed with the anionic component comprising the steps of adding a reagent which is capable of replacing the complexed conjunct polymer with the cationic component of the catalyst, said reagent being added in an amount sufficient to react with a suitable amount of both free and complexed anionic components in the used catalyst and removing the replaced conjunct polymer to produce a regenerated ionic liquid catalyst is disclosed.

28 Claims, 1 Drawing Sheet

OTHER PUBLICATIONS

Yoo, Kyesang et al, ionic liquid-catalyzed aklyation of isobutane with 2-butene, 2004, Journal of Catalysis 222, pp. 511-519.*

Miron et al., molecular structure of conjunct polymers, 1963 journal of chemical and engineering data, vol. 8, pp. 150-160.*

Molnar et al, oligomerization and polymerization, 2003, hydrocarbon chemistry, pp. 723-726.*

Kubisa, application of ionic liquids as solvents for polymerization processes, 2003, progress in polymer science pp. 2-11.*

Christopher J. Adams, et al., Stereoslective hydogenation reacations in chloroaluminate (III) ionic liquids: a new method for the reduction of aromatic compounds, Institute of Applied Catalysis, Schoold of Chemistry, 1999, 1043-1044, Feb. 15, 1999, Accepted Apr. 19, 1999.

* cited by examiner

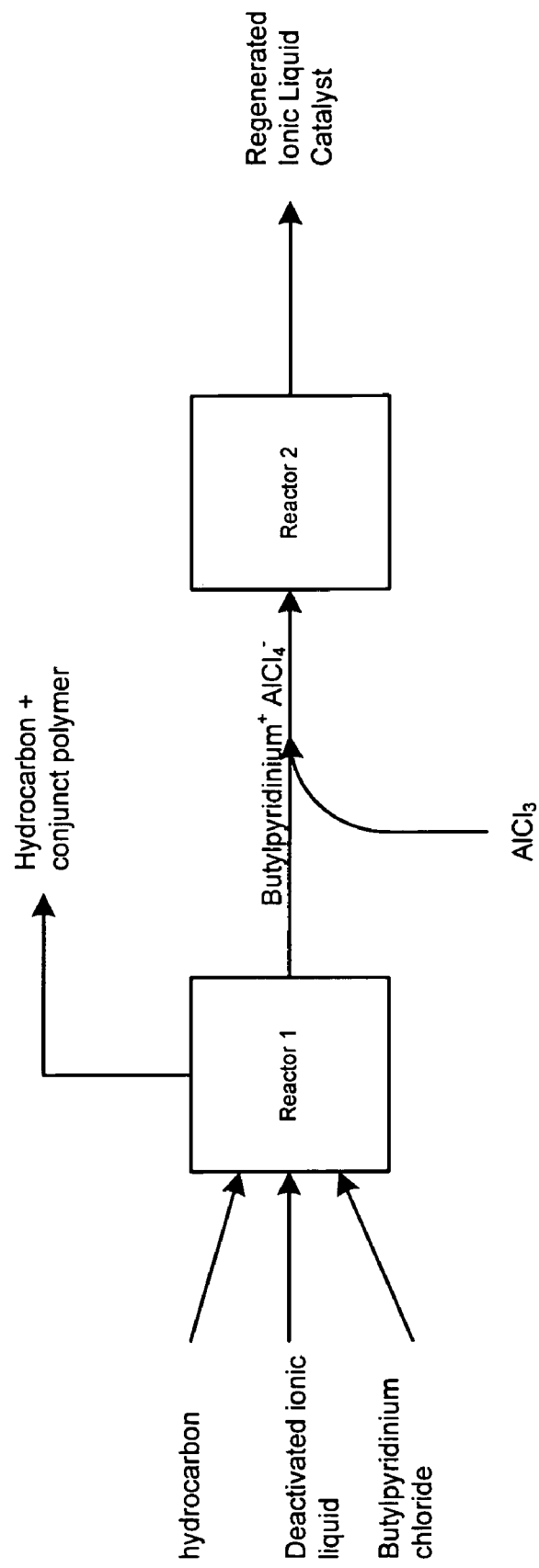

REGENERATION OF IONIC LIQUID CATALYST

FIELD OF THE INVENTION

The present invention relates to methods for the regeneration of catalysts and more specifically to the regeneration of ionic liquid catalysts.

BACKGROUND OF THE INVENTION

Ionic liquids are liquids that are composed entirely of ions. The so-called "low temperature" Ionic liquids are generally organic salts with melting points under 100 degrees C., often even lower than room temperature. Ionic liquids may be suitable for example for use as a catalyst and as a solvent in alkylation and polymerization reactions as well as in dimerization, oligomerization acetylation, metatheses, and copolymerization reactions.

One class of ionic liquids is fused salt compositions, which are molten at low temperature and are useful as catalysts, solvents and electrolytes. Such compositions are mixtures of components which are liquid at temperatures below the individual melting points of the components.

Ionic liquids can be defined as liquids whose make-up is entirely comprised of ions as a combination of cations and anions. The most common ionic liquids are those prepared from organic-based cations and inorganic or organic anions. The most common organic cations are ammonium cations, but phosphonium and sulphonium cations are also frequently used. Ionic liquids of pyridinium and imidazolium are perhaps the most commonly used cations. Anions include, but not limited to, $BF_4^-$, $PF_6^-$, haloaluminates such as $Al_2Cl_7^-$ and $Al_2Br_7^-$, $[(CF_3SO_2)_2N]^-$, alkyl sulphates ($RSO_3^-$), carboxylates ($RCO_2^-$) and many other. The most catalytically interesting ionic liquids are those derived from ammonium halides and Lewis acids (such as $AlCl_3$, $TiCl_4$, $SnCl_4$, $FeCl_3$ . . . etc). Chloroaluminate ionic liquids are perhaps the most commonly used ionic liquid catalyst systems.

Examples of such low temperature ionic liquids or molten fused salts are the chloroaluminate salts. Alkyl imidazolium or pyridinium salts, for example, can be mixed with aluminum trichloride ($AlCl_3$) to form the fused chloroaluminate salts. The use of the fused salts of 1-alkylpyridinium chloride and aluminum trichloride as electrolytes is discussed in U.S. Pat. No. 4,122,245. Other patents which discuss the use of fused salts from aluminum trichloride and alkylimidazolium halides as electrolytes are U.S. Pat. Nos. 4,463,071 and 4,463,072.

U.S. Pat. No. 5,104,840 describes ionic liquids which comprise at least one alkylaluminum dihalide and at least one quaternary ammonium halide and/or at least one quaternary ammonium phosphonium halide; and their uses as solvents in catalytic reactions.

U.S. Pat. No. 6,096,680 describes liquid clathrate compositions useful as reusable aluminum catalysts in Friedel-Crafts reactions. In one embodiment, the liquid clathrate composition is formed from constituents comprising (i) at least one aluminum trihalide, (ii) at least one salt selected from alkali metal halide, alkaline earth metal halide, alkali metal pseudohalide, quaternary ammonium salt, quaternary phosphonium salt, or ternary sulfonium salt, or a mixture of any two or more of the foregoing, and (iii) at least one aromatic hydrocarbon compound.

Aluminum-containing catalysts are among the most common Lewis acid catalysts employed in Friedel-Craft reactions. Friedel-Craft reactions are reactions which fall within the broader category of electrophylic substitution reactions including alkylations.

Other examples of ionic liquids and their methods of preparation may also be found in U.S. Pat. Nos. 5,731,101; 6,797,853 and in U.S. Patent Application Publications 2004/0077914 and 2004/0133056.

As a result of use, ionic liquid catalysts become deactivated, i.e. lose activity, and may eventually need to be replaced. However, ionic liquid catalysts are expensive and replacement adds significantly to operating expenses by in some cases requiring shut down of an industrial process. One of the heretofore unsolved problems impeding the commercial use of chloroaluminate ionic liquid catalysts has been the inability to regenerate and recycle them. The present invention provides methods to regenerate acidic chloroaluminate ionic liquid catalysts overcoming this obstacle and paving the way for the practical, commercial use of these environmentally friendly catalysts.

SUMMARY OF THE INVENTION

Among other things, the present invention provides a process for regenerating a used ionic liquid catalyst which has been deactivated by conjunct polymers comprising the steps of adding a reagent which is capable of replacing the complexed conjunct polymer with the cationic component of the catalyst, said reagent being added in an amount sufficient to react with a suitable amount of both free and complexed anionic components in the used catalyst and removing the replaced conjunct polymer to produce a regenerated ionic liquid catalyst.

BRIEF DESCRIPTION OF THE DRAWING

The FIGURE is a block diagram of an embodiment of an ionic liquid catalyst regeneration according to the invention.

DETAILED DESCRIPTION

The present invention relates to a process for the regeneration of spent or deactivated acidic ionic liquid-based catalysts i.e. those catalysts which have lost all or some of their catalytic activity. The present process is being described and exemplified with reference certain specific ionic liquid catalysts and processes catalyzed thereby, but such description is not intended to limit the scope of the invention. The methods described may be applied to other catalysts and processes by those persons having ordinary skills based on the teachings, descriptions and examples included herein.

The specific examples used herein refer to alkylation processes using ionic liquid systems, which are amine-based cationic species mixed with aluminum chloride. In such systems, to obtain the appropriate acidity suitable for the alkylation chemistry, the ionic liquid catalyst is generally prepared to full acidity strength by mixing one molar part of the appropriate ammonium chloride with two molar parts of aluminum chloride. The catalyst exemplified for the alkylation process is a 1-alkyl-pyridinium chloroaluminate, such as 1-butyl-pyridinium heptachloroaluminate.

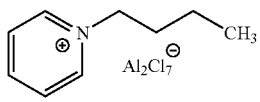

1-Butyl-pyridinium heptachloroaluminate

In general, a strongly acidic ionic liquid is necessary for alkylation, e.g. isoparaffin alkylation. In that case, aluminum chloride, which is a strong Lewis acid in a combination with a small concentration of a Broensted acid, is a preferred catalyst component in the ionic liquid catalyst scheme.

While not being bound to this or any other theory of operation, the present invention is based in part on our discovery that one of the major catalyst deactivation mechanisms is the formation of by-products known as conjunct polymers. The term conjunct polymer was first used by Pines and Ipatieff to distinguish these polymeric molecules from the usual polymers. Unlike typical polymers, conjunct polymers are polyunsaturated cyclic, polycyclic and acyclic molecules formed by concurrent acid-catalyzed reactions including, among others, polymerization, alkylation, cyclization, and hydride transfer reactions. Conjunct polymers consist of unsaturated intricate network of molecules that may include one or a combination of 4-, 5-, 6- and 7-membered rings in their skeletons. Some examples of the likely polymeric species were reported by Miron et al. (*Journal of chemical and Engineering Data,* 1963) and Pines (*Chem. Tech,* 1982). These molecules contain double and conjugated double bonds in intricate structures containing a combination of cyclic and acyclic skeletons.

The conjunct polymers deactivate the chloroaluminate ionic liquid catalysts by weakening the acid strength of the catalyst through the formation of complexes of conjunct polymers and $AlCl_3$ possibly by means of electron-donor/electron-acceptor interactions. The conjunct polymers with their double bonds are the donors and the Lewis acid ($AlCl_3$) is the acceptor. Using their double bonds, the conjunct polymers coordinate to the Lewis acid ($AlCl_3$) in the ionic liquid making the coordinated $AlCl_3$ less active or inaccessible for catalysis. Thus, the acidity of the catalyst becomes weaker and the overall catalytic activity becomes compromised and no longer effective for the intended purpose. Thus, the catalyst performance will become a function of the concentration of conjunct polymers in the ionic liquid phase. As more conjunct polymers accumulate in the ionic liquid phase the catalyst becomes less active. So, removal of all or a suitable portion of the conjunct polymers from the ionic liquid phase is a significant aspect of the present process for ionic liquids catalyst regeneration.

The term "conjunct polymer" as used herein also includes any other species which might complex to $AlCl_3$ by pi bonding or sigma bonding or other means, which results in those species binding to the ionic liquid, so they are not removable by simple hydrocarbon extraction.

It is believed that deactivation of the catalyst by the presence of conjunct polymers is, in part at least, caused by coordination and complex formation between the Lewis acid $AlCl_3$ (electron pair acceptor) and the conjunct polymers (electron donors). In such complexes, the $AlCl_3$ is no longer available for catalysis since it is tied-up in the $AlCl_3$-conjunct polymers complexes. It also appears that the presence (or accumulation) of conjunct polymer molecules in the catalyst phase is not by virtue of being miscible in the ionic liquid phase. While conjunct polymers may be somewhat miscible in the ionic liquids, their accumulation in the catalyst phase is more likely to being bound by strong acid-base interactions (complexation) rather than being soluble in the ionic liquid phase.

Conjunct polymers isolated from the catalyst phase by means of hydrolysis are highly soluble in hydrocarbons. However, attempts to remove them from the catalyst phase prior to hydrolysis by simple extraction methods with hydrocarbon solvents such as hexane, decane and toluene were unsuccessful. Other more polar solvents such as $CH_2Cl_2$ and chloroform may dissolve chloroaluminate ionic liquids and therefore is not selective solvents for dissolving and removing the conjunct polymers. Conjunct polymers may be isolated by hydrolysis. However, these methods of isolating the conjunct polymers are destructive, and result in an actual loss of a catalytic component ($AlCl_3$). The hydrolysis methods hydrolyze the catalytic component ($AlCl_3$) and transform it into inactive aluminum hydroxide and aluminum oxide. This indicates that the conjunct polymers are tightly held in the ionic liquid phase by fairly strong type of bonding system. Therefore, any successful attempt to reactivate and regenerate the catalyst must involve the removal of conjunct polymers to release aluminum trichloride from the $AlCl_3$-conjunct polymer complexes without destroying, consuming, or irreversibly tying up the $AlCl_3$. In other words, one objective is to free the catalyst by replacing the conjunct polymers with other basic species that simply displace the polymer without destroying the catalyst or by suppressing the ability of conjunct polymers to form complexes with Lewis acids (aluminum chloride).

There are numerous reagents that can be used to break up the $AlCl_3$-conjunct polymer complexes including, e.g. amines. One important consideration is that any of these basic species would form, most likely, irreversible complexes with $AlCl_3$ similar to the $AlCl_3$-conjunct polymer complexes. Moreover, there is no selective method to break up $AlCl_3$-conjunct polymer complexes. In other words, any reagent that may be used to break up the $AlCl_3$-conjunct polymer complexes will also react with other aluminum species in the catalyst phase Therefore, to ensure the complete break-up of the complexes by a reagent, sufficient reagent must be added to react with all $AlCl_3$ molecules in the system, both bound and unbound.

Since any reagent to be used in the removal process of conjunct polymers from the spent catalyst will form new complexes (e.g. $AlCl_3$-reagent complexes), thereby destroying active catalytic components, there will be no gain from this procedure unless the reagent to be used is part of the catalyst system undergoing regeneration. Consequently, a process according to this invention, employs basic species that can displace the conjunct polymers and be part of the regeneration or recycling process of the catalyst. For example, in the butyl-pyridinium chloroaluminate ionic liquid catalyst system, butylpyridinium chloride, where the chloride is the basic specie, would be used to break up the $AlCl_3$-conjunct polymer complexes in the spent catalyst.

Where, for example, the ionic liquid is formed by mixing either an amine hydrochloride or an alkyl ammonium halide with a Lewis acid, in accordance with the present invention, a process whereby aluminum chloride is released from the $AlCl_3$-conjunct polymer complex is conducted by using either amines or ammonium chloride depending on the ionic liquid that is being regenerated. More specifically, for 1-butyl-pyridinium heptachloroaluminate, the conjunct polymers are released by adding butyl-pyridinium chloride to the deactivated catalyst. The chloride of the 1-butyl-pyridinium chloride interacts with the non-complexed and complexed aluminum species in the spent catalyst phase and thus freeing the conjunct polymers from the AlCl$_3$-conjunct polymer complexes. The released conjunct polymers are then removed, for example, by extraction with low boiling n-paraffins. The remaining solid residues, presumably butylpyridinium tetrachloroaluminate, are converted back to ionic liquid (butylpyridinium heptachloroaluminate) by adding more AlCl$_3$ as set forth below.

ionic liquid. The reactor, which may be a stirred tank or other type of contactor (e.g., riser reactor), produces a biphasic mixture of alkylate hydrocarbons, unreacted isoparaffins, and ionic liquid catalyst containing some conjunct polymers. The catalyst/conjunct polymer phase, which is denser than other components, may be separated from the hydrocarbons by means of a gravity decanter. This catalyst will be partially deactivated by the conjunct polymers binding to AlCl$_3$. The

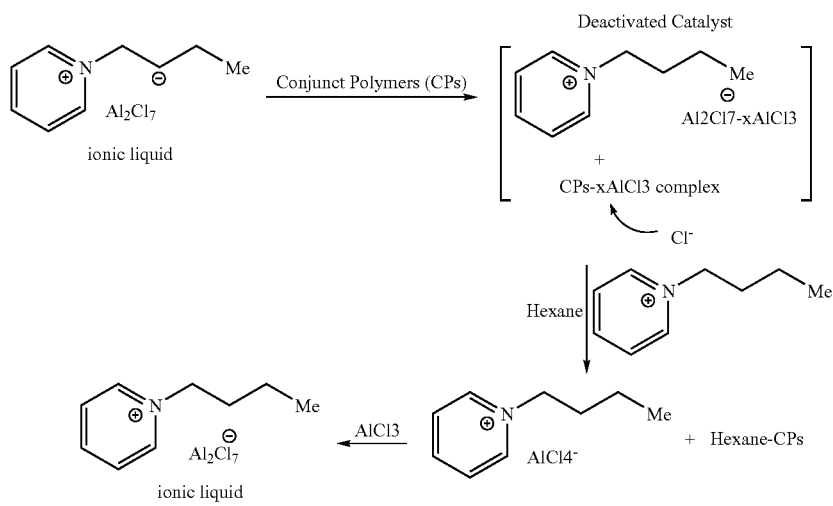

Using this process, a stream of the catalyst is reactivated and the regenerated catalyst is recycled back into the reactor. By employing a method according to the invention, the concentration of the conjunct polymers can be minimized while the catalyst strength is maintained by reintroducing the regenerated catalyst into the reaction cycle.

The principle used for selecting a suitable reagent is not only limited to using butylpyridinium in butylpyridinium chloroaluminate or butylpyridinium chloroaluminate-like ionic liquids. It is applicable to ionic liquids in general. The reagent is one which corresponds to the basic parent species of cation from which the ionic liquid to be regenerated was originally produced.

As a further example of this principle, consider ionic liquids that were produced from ammonium hydrohalides and aluminum chlorides. In this case, the basic reagent that is used to break up the AlCl$_3$-conjunct polymer complex is the free amine corresponding to the ammonium hydrohalide salt. Conjunct polymers are removed and ammonium tetrachloroaluminate is produced. Addition AlCl$_3$/HCl is used to reconstitute the ionic liquid.

In summary, for aluminum chloride-based ionic liquid catalysts, a deactivated catalyst can be revived in a nondestructive manner by freeing up the AlCl$_3$ from conjunct polymer-AlCl$_3$ complex. The process employs the parent amine in the case of an ionic liquid catalyst derived from ammonium hydrochlorides and aluminum halides, or employing alkyl ammonium halides when the ionic liquid catalyst is derived from alkyl ammonium halides and aluminum.

As noted previously, ionic liquid catalysts may become deactivated during use. For example, in an alkylate production unit, light (C$_2$-C$_5$) olefins and isoparaffin feeds are contacted in the presence of a catalyst that promotes the alkylation reaction. In one embodiment of a process in accordance with the present invention, this catalyst is a chloroaluminate recovered catalyst can be reactivated by first contacting the recovered catalyst with butylpyridinium chloride in a first regeneration reactor to give butylpyridinium tetrachloroaluminate and "free" conjunct polymer. The free conjunct polymer is removed. The remaining butylpyridinium tetrachloroaluminate is then sent to a second regeneration reactor where it is contacted with AlCl$_3$ to fully restore the activity of the catalyst. The regenenerated ionic liquid catalyst effluent of the second reactor is then recycled to the alkylate production unit.

It is not necessary to regenerate the entire charge of catalyst. In some instances only a portion or slipstream of the catalyst charge is regenerated. In those instances only as much ionic liquid catalyst is regenerated as is necessary to maintain a desired level of catalyst activity in the process in which the ionic liquid is used as the catalyst.

In one embodiment of the present invention with reference to the FIGURE, a used ionic liquid catalyst/conjunct polymer mixture is introduced continuously into a regeneration reactor along with butylpyridinium chloride and inert hydrocarbons in which hydrogenated conjunct polymers are soluble at the desired rate. The inert hydrocarbons may be a normal hydrocarbons ranging from C$_5$-C$_{15}$, preferably C$_5$-C$_8$ and their mixtures, although other hydrocarbons may be employed. A conjunct polymer-hydrocarbon mixture is removed from the first regeneration reactor. The remaining butylpyridinium tetrachloroaluminate is then sent to a second regeneration reactor where it is contacted with AlCl$_3$ to fully restore the activity of the catalyst. The regenerated ionic liquid catalyst is removed from the second reactor and can then be recycled.

The block diagram in the FIGURE is not meant to restrict the present invention any sort or type of reactor. Also, the FIGURE shows an inert hydrocarbon entering the reactor together with the deactivated ionic liquid. That is an optional implementation. The hydrocarbon could be left out entirely or it could be added to the separator to allow extraction and separation simultaneously. Other modifications are possible and are included in the scope of the present invention.

The following Examples are illustrative of the present invention, but are not intended to limit the invention in any way beyond what is contained in the claims which follow.

EXAMPLES

Example 1

Preparation of Fresh 1-Butyl-Pyridinium Chloroaluminate Ionic Liquid Catalyst A (Fresh IL A)

1-butyl-pyridinium chloroaluminate is a room temperature ionic liquid prepared by mixing neat 1-butyl-pyridinium chloride (a solid) with neat solid aluminum trichloride in an inert atmosphere. The syntheses of butylpyridinium chloride and the corresponding 1-butyl-pyridinium chloroaluminate are described below. In a 2-L Teflon-lined autoclave, 400 gm (5.05 mol.) anhydrous pyridine (99.9% pure purchased from Aldrich) were mixed with 650 gm (7 mol.) 1-chlorobutane (99.5% pure purchased from Aldrich). The autoclave sealed and the neat mixture allowed to stir at 125° C. under autogenic pressure over night. After cooling off the autoclave and venting it, the reaction mix was diluted and dissolved in chloroform and transferred to a three liter round bottom flask. Concentration of the reaction mixture at reduced pressure on a rotary evaporator (in a hot water bath) to remove excess chloride, un-reacted pyridine and the chloroform solvent gave a tan solid product. Purification of the product was done by dissolving the obtained solids in hot acetone and precipitating the pure product through cooling and addition of diethyl ether. Filtering and drying under vacuum and heat on a rotary evaporator gave 750 gm (88% yields) of the desired product as an off-white shiny solid. $^1$H-NMR and $^{13}$C-NMR were consistent with the desired 1-butyl-pyridinium chloride and no impurities were observed.

1-Butyl-pyridinium chloroaluminate was prepared by slowly mixing dried 1-butyl-pyridinium chloride and anhydrous aluminum chloride ($AlCl_3$) according to the following procedure. The 1-butyl-pyridinium chloride (prepared as described above) was dried under vacuum at 80° C. for 48 hours to get rid of residual water (1-butyl-pyridinium chloride is hydroscopic and readily absorbs water from exposure to air). Five hundred grams (2.91 mol.) of the dried 1-butyl-pyridinium chloride were transferred to a 2-Liter beaker in a nitrogen atmosphere in a glove box. Then, 777.4 gm (5.83 mol.) of anhydrous powdered $AlCl_3$ (99.99% from Aldrich) were added in small portions (while stirring) to control the temperature of the highly exothermic reaction. Once all the $AlCl_3$ was added, the resulting amber-looking liquid was left to gently stir overnight in the glove box. The liquid was then filtered to remove any un-dissolved $AlCl_3$. The resulting acidic 1-butyl-pyridinium chloroaluminate was used as the catalyst for the alkylation of isopentane with ethylene.

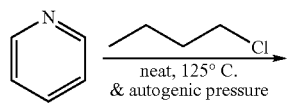

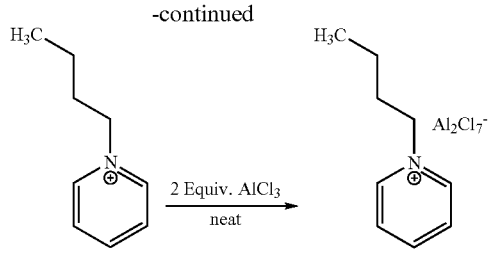

Example 2

Preparation of "Deactivated" 1-Butyl-pyridinium Chloroaluminate Ionic Liquid Catalyst (Deactivated Catalyst A)

"Deactivated" or "used" 1-butyl-pyridinium chloroaluminate ionic liquid catalyst was prepared from "fresh" 1-butyl-pyridinium chloroaluminate ionic liquid catalyst by carrying out the isobutane alkylation reaction in a continuous flow microunit under catalyst recycle with accelerated fouling conditions.

The microunit consists of feed pumps for isobutane and butenes, a stirred autoclave reactor, a back pressure regulator, a three phase separator, and a third pump to recycle the separated ionic liquid catalyst back to the reactor. The reactor was operated at 80 to 100 psig pressure and with cooling to maintain a reaction temperature of ~10° C. To start the reaction, isobutane, butenes, and HCl were pumped into the autoclave at the desired molar ratio (isobutane/butenes>1.0), through the back pressure regulator, and into the three phase separator. At the same time, fresh chloroaluminate ionic liquid catalyst was pumped into the reactor at a rate pre-calculated to give the desired catalyst/feed ratio on a volumetric basis. As the reaction proceeded, ionic liquid separated from the reactor effluent and collected in the bottom of the three phase separator. When a sufficient level of catalyst built up in the bottom of the separator, the flow of fresh ionic liquid was stopped and catalyst recycle from the bottom of the separator was started. In this way, the initial catalyst charge was continually used and recycled in the process.

The following process conditions were used to generate Deactivated Catalyst A (1-butyl-pyridinium chloroaluminate ionic liquid catalyst) from Fresh Catalyst A:

| Process Variable | |
| --- | --- |
| Isobutane pump rate | 4.6 g/min |
| Butene pump rate | 2.2 g/min |
| IL Catalyst pump rate | 1.6 g/min |
| HCl flow rate | 3.0 SCCM |
| pressure | 100 psig |
| temperature | 10° C. |

The reaction was continued for 72 hours when it was judged that the catalyst had become sufficiently deactivated.

Example 3

Determination of the Amounts of Conjunct Polymer and Olefin Oligomers in Deactivated IL A The wt % of conjunct polymers in the spent (deactivated) ionic liquid was determined by hydrolysis of known weights of the spent catalyst. The example below is a typical procedure for measuring conjunct polymers in a given spent catalyst. In a glove box, 15 gm of a spent ionic liquid catalyst in a flask were rinsed first with 30-50 ml of anhydrous hexane to remove (from the spent catalyst) any residual hydrocarbon or olefinic oligomers. The hexane rinse was concentrated under reduced pressure to give only 0.02 gm of yellow oil (0.13%). Then, 50 ml of anhydrous hexane was added to the rinsed catalyst followed by slow addition of 15 ml of water, and the mixture was stirred at 0° C. for 15-20 minutes. The resulting mixture was diluted with additional 30 ml hexanes and stirred well for additional 5-10 minutes. The mixture was allowed to settle down to two layers solution and some solid residue. The organic layer was recovered by decanting. The aqueous layer was further washed with additional 50 ml hexanes. The hexanes layers were combined and dried over anhydrous $MgSO_4$, filtered and concentrated to give 2.5 gm (16.7 wt % of the spent catalyst) of viscous dark orange-reddish oil. It was determined therefore that this particular spent catalyst contains 0.13% oligomers and 16.7% conjunct polymers. The hydrolysis can also be accomplished using acidic (aqueous HCl) or basic (aqueous NaOH) solutions.

Example 4

Characterization of Recovered Conjunct Polymer from Deactivated IL A

The recovered conjunct polymers according to the procedure described in Example 3 were characterized by elemental analysis and by infrared, NMR, GC-Mass and UV and spectroscopy methods. The recovered conjunct polymers have hydrogen/carbon ratio of 1.76 and chlorine content of 0.8%. $^1$H-NMR and $^{13}$C-NMR showed the presence of olefinic protons and olefinic carbons. Infrared spectroscopy indicated the presence of olefinic regions and the presence of cyclic systems and substituted double bonds. GCMS showed the conjunct polymers to have molecular weights ranging from 150-mid 600s. The recovered conjunct polymers have boiling ranges of 350-1100° F. as indicated by high boiling simulated distillation analysis. UV spectroscopy showed a UV $\lambda_{max}$ at 250 nm pointing highly conjugated double bonds systems.

Example 5

Removal of Conjunct Polymer from Deactivated Catalyst A by the Addition of Pyridine Note that a process based on this example would require the addition of HCl and $AlCl_3$ in the second regeneration reactor. In this case, the cation of the ionic liquid is pyridinium hydrochloride chloride, with H— instead of butyl-.

Deactivated Catalyst A (10.022 g) was weighed into a bottle and treated with 2.24 g of pyridine. After stirring for 45 minutes at ambient temperature, the contents of the bottle were extracted three times with 6.8 g of hexane. The hexane extracts were combined and evaporated under a stream of nitrogen. The net weight of residue was 1.84 grams or 18.4 wt %.

Example 6

Removal of Conjunct Polymer from Deactivated Catalyst A by 1-Butyl-Pyridinium Chloride In a round bottom reaction flask equipped with stirring bar and drying tube ($CaCl_2$ drying tube) 100 gm of anhydrous hexane were added to 20 gm of spent butylpyridinium chloroaluminate ionic liquid catalyst containing 16 wt % (3.2 gm) conjunct polymers. Five grams of butylpyridinium chloride was added to the 20 gm of spent catalyst already in 100 ml anhydrous hexane. The reaction was stirred for 30 min. and the hexane layer was decanted off. The residue was rinsed with an additional 50 ml hexane. The hexane layers were added and concentrated to give 1.2 gm of possible 3.2 gm of conjunct polymers. An additional 3 gm of butylpyridinium chloride and 50 ml anhydrous hexane were added to the ionic liquid residue from the treatment of the first 5 gm of butylpyridinium chloride and the mixture was stirred for ~15-20 minutes. The reaction mixture turned into two phases. One phase consisted of granulated brown solids and the hexane layer containing the remainder of the conjunct polymers. The hexane layer was decanted off and the remaining solids were rinsed with additional 50 ml anhydrous hexane. The hexane layers were combined and concentrated on a rotary evaporator to give additional 1.95 gm of conjunct polymers (in addition to the 1.2 gm recovered from the first addition of butylpyridinium chloride). Thus, a total of 3.15 gm or 98.4% of the conjunct polymers present in the spent catalyst were removed. The above procedure was repeated with similar results using other spent catalysts with varying conjunct polymers contents.

The recovered conjunct polymers removed by the procedure described above exhibited all the physical and spectroscopic characteristics of conjunct polymers isolated by hydrolysis methods.

The recovered solid were stripped off the solvent (not to dryness) on a rotary evaporator at 14 torr and 60° C. To the obtained brown solids, in an Erlenmeyer flask in a glove box, 6.5 gm of $AlCl_3$ were slowly added while stirring. After al the $AlCl_3$ was added, the resulting liquid was allowed to stir for additional 30 minutes. The liquid was then filtered and used for alkylation of ethylene with isopentane as a test for the activity of this partially regenerated ionic liquid catalyst.

Example 7

Determination of The Activity of The Regenerated ButylPyridinium Chloroaluminate Ionic Liquid catalyst The regenerated butylpyridinium chloroaluminate ionic liquid catalyst described in Example 6 was tested for activity by using it as the catalyst in the alkylation of isopentane with ethylene and comparing it with freshly-made catalyst. The alkylation of isopentane with ethylene was done according to the following procedure. A 300 cc autoclave was charged with 20 gm of ionic liquid catalyst, 100 gm anhydrous isopentane, 10 gm ethylene and 0.3 gm anhydrous HCl. The reaction was then stirred ~1200 rpm and heated to 50° C. at autogenic pressures. The starting pressure was usually 280-320 psi. The reaction was usually complete when the pressure dropped down to single digits. In the case of slow going reaction, the reaction was allowed to go on for 1 hr. At the end of the reaction, the reactor was vented out and a gas sample was checked by GC for ethylene concentration. The two phase reaction mixture was allowed to settle into catalyst phase (lower phase) and the hydrocarbon phase (the upper phase). The hydrocarbon phase containing the feeds and the alkylation products was decanted and analyzed for product distribution by GC analysis.

Table 1 below shows the ethylene/isopentane alkylation results of this regenerated catalyst compared with the alkylation results of the fresh and the spent catalyst.

TABLE 1

|  | Fresh Catalyst | Spent Catalyst | Regen. Cat. |
|---|---|---|---|
| Reaction Time | 9 min. | 60 min. | 14 min. |
| Starting Pressure | 300 psi | 286 psi | 280 psi |
| Ending pressure | 17 | 302 psi | 4 psi |
| iC5 | 72 | 98% | 69.4% |
| C7s | 19 (72%) | ~1.4% | 20.1% |
| 2,3-DM-Pentane | 8.23 (31.5%) | 0.9 | 10.7% |
| 2,4-DM-Pentane | 10 (38%) | 0.6 | 8.9% |
| 2,3DM/2,4DM | 0.82 | 1.5 | 1.2 |

Alkylation of ethylene with isopentane at iC5/C2= of 4 @ 50° C.

From the table above, the activity of the regenerated catalyst is comparable to that of the fresh catalyst. The spent catalyst containing the conjunct polymers is inactive.

What is claimed is:

1. A process for regenerating a used ionic liquid catalyst comprising a cationic component and an anionic component which has been deactivated by a complexed conjunct polymer that has complexed with the anionic component, comprising the steps of:
   a. adding a reagent which is capable of replacing the complexed conjunct polymer in the used ionic liquid catalyst with the cationic component of the used ionic liquid catalyst to make a used ionic liquid—reagent mixture, said reagent being added in an amount sufficient to react with a suitable amount of both free (non-complexed) and complexed anionic components in the used ionic liquid catalyst wherein a replaced conjunct polymer is made; and
   b. removing the replaced conjunct polymer to produce a regenerated ionic liquid catalyst.

2. The process according to claim 1, further comprising adding an inert hydrocarbon to the used ionic liquid—reagent mixture to remove the replaced conjunct polymer and any inactive ionic liquid catalyst component and reconstituting the used ionic liquid catalyst which has been deactivated.

3. The process according to claim 1, wherein the reagent corresponds to a basic parent species of cation from which the used ionic liquid catalyst which has been deactivated was originally produced.

4. The process according to claim 1, wherein the used ionic liquid catalyst is 1-butyl-pyridinium heptachloroaluminate and the reagent is 1-butyl-pyridinium chloride.

5. The process according to claim 2, wherein the inert hydrocarbon is selected from the group consisting of hydrocarbons ranging from $C_5$-$C_{15}$ and their mixtures.

6. The process according to claim 1, wherein the used ionic liquid catalyst has been used to catalyze a Friedel-Craft reaction.

7. The process according to claim 6, wherein the Friedel-Craft reaction is alkylation.

8. The process according to claim 1, wherein the used ionic liquid catalyst comprises an imidazolium, pyridinium, phosphonium or tetralkylammonium derivative or their mixtures.

9. The process according to claim 1, wherein the used ionic liquid catalyst is a chloroaluminate ionic liquid.

10. The process according to claim 8, wherein the used ionic liquid catalyst is a chloroaluminate ionic liquid.

11. The process according to claim 4, further comprising adding $AlCl_3$, HCl or a mixture thereof to the regenerated ionic liquid catalyst.

12. The process according to claim 9, further comprising adding $AlCl_3$, HCl or a mixture thereof to the regenerated ionic liquid catalyst.

13. The process according to claim 10, further comprising adding $AlCl_3$, HCl or a mixture thereof to the regenerated ionic liquid catalyst.

14. A process for regenerating a used ionic liquid catalyst comprising a cationic component and an anionic component, which has been deactivated by a complexed conjunct polymer that has complexed with the anionic component, comprising adding a reagent which is capable of replacing the complexed conjunct polymer with the cationic component of the used ionic liquid catalyst to make a used ionic liquid—reagent mixture, said reagent being added in an amount sufficient to increase the activity of the used ionic liquid catalyst; wherein a regenerated catalyst is made.

15. The process according to claim 14, further comprising adding an inert hydrocarbon to the used ionic liquid—reagent mixture to remove a replaced conjunct polymer and any inactive ionic liquid catalyst component and reconstituting the used ionic liquid catalyst which has been deactivated.

16. The process according to claim 14, wherein the reagent corresponds to a basic parent species of cation from which the used ionic liquid catalyst which has been deactivated was originally produced.

17. The process according to claim 14, wherein the used ionic liquid catalyst is 1-butyl-pyridinium heptachloroaluminate and the reagent is 1-butyl-pyridinium chloride.

18. The process according to claim 15, wherein the inert hydrocarbon is selected from the group consisting of hydrocarbons ranging from $C_5$-$C_{15}$ and their mixtures.

19. The process according to claim 14, wherein the used ionic liquid catalyst has been used to catalyze a Friedel-Craft reaction.

20. The process according to claim 19, wherein the Friedel-Craft reaction is alkylation.

21. The process according to claim 14, wherein the used ionic liquid catalyst comprises an imidazolium, pyridinium, phosphonium or tetralkylammonium derivative or their mixtures.

22. The process according to claim 14, wherein the used ionic liquid catalyst is a chloroaluminate ionic liquid.

23. The process according to claim 21, wherein the used ionic liquid catalyst is a chloroaluminate ionic liquid.

24. The process according to claim 17, further comprising adding $AlCl_3$, HCl or a mixture thereof to the regenerated catalyst.

25. The process according to claim 22, further comprising adding $AlCl_3$, HCl or a mixture thereof to the regenerated catalyst.

26. The process according to claim 23, further comprising adding $AlCl_3$, HCl or a mixture thereof to the regenerated catalyst.

27. A process for regenerating a used acidic ionic liquid catalyst which has been deactivated by a complexed conjunct polymer, comprising: adding a reagent which is capable of replacing the complexed conjunct polymer with a cationic component of the used acidic ionic liquid catalyst to make a used acidic ionic liquid-reagent mixture, said reagent being added in an amount sufficient to increase the activity of the used acidic ionic liquid catalyst; wherein a regenerated catalyst is made; and wherein the used acidic ionic liquid catalyst has been used to catalyze an alkylation of an isoparaffin with an olefin.

28. The process according to claim 27, wherein the complexed conjunct polymer is not removed by extraction with hydrocarbon solvents.

* * * * *